Aug. 10, 1965    T. BOSMA, JR    3,199,433
VENTILATION SYSTEM
Filed April 16, 1963    3 Sheets-Sheet 1

Thomas Bosma, Jr.
INVENTOR.

Aug. 10, 1965     T. BOSMA, JR     3,199,433
VENTILATION SYSTEM
Filed April 16, 1963     3 Sheets-Sheet 2

Thomas Bosma, Jr.
INVENTOR.

Aug. 10, 1965  T. BOSMA, JR  3,199,433
VENTILATION SYSTEM
Filed April 16, 1963  3 Sheets-Sheet 3
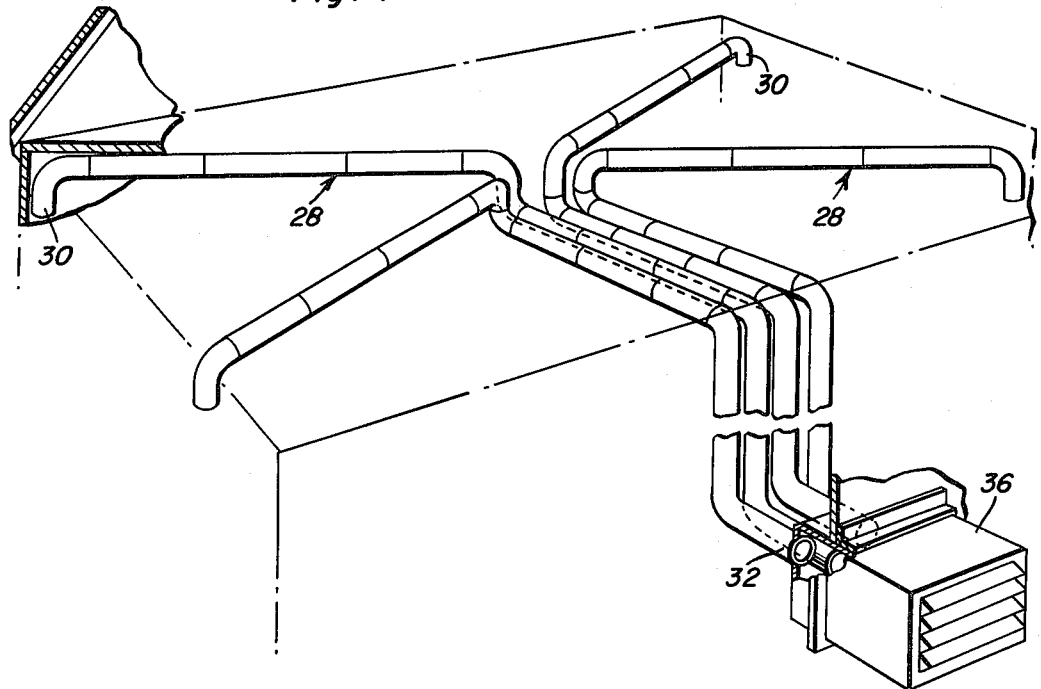
Fig. 4
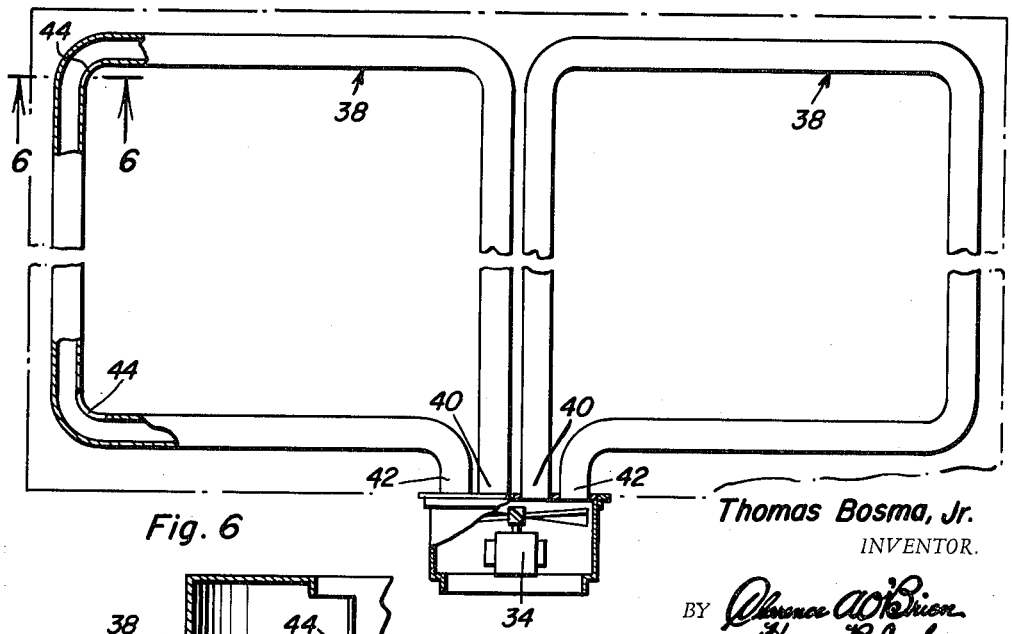
Fig. 5
Fig. 6
Thomas Bosma, Jr.
INVENTOR.

United States Patent Office 3,199,433
Patented Aug. 10, 1965

3,199,433
VENTILATION SYSTEM
Thomas Bosma, Jr., Box 321, Buffalo Center, Iowa
Filed Apr. 16, 1963, Ser. No. 273,388
2 Claims. (Cl. 98—43)

The present invention relates to new and useful means for ventilating farm buildings such as poultry, hog, and dairy houses, as well as any other type of enclosure or building wherein the removal of stale, moisture-laden, or dust-laden air is desired with only a very minimum amount of air disturbance in general.

One of the primary objects of the present invention is to provide a ventilation system which evenly and smoothly draws the stale or undesirable air from all portions of a room, this drawing of the air being done through individual ducts or pipes, each duct being vented independently to the exterior of the structure so as to prevent any commingling of the air being removed from the various portions of the structure thus eliminating any tendency for a backlash or backflow to occur.

In conjunction with the above object, it is also an object of the present invention to provide a ventilating system which will keep a builiding drier and warmer in the winter and cooler in the summer so as to assist in maintaining the health of, for example, farm animals.

It is also an object of the present invention to maintain the desired ventilation with no drafts or sudden variations in the airflow or condition.

Furthermore, it is an object of the present invention to provide a system wherein the natural tendency of warm air to rise is utilized, the intake ends of the ducts being located at or near the building ceiling.

Another object of the present invention resides in the contemplated incorporation of a variable speed thermostat controlled exhaust fan into the system, this fan being orientated relative to the exhaust ends of the individual ducts so as to draw equally from all of the ducts.

Furthermore, it is an object of the present invention to provide a ventilation system which can be economically manufactured at a minimum cost so as to put it well within the reach of even the small farm operators, it being contemplated that the increased production resulting from the healthier surroundings quickly compensating the purchaser for the minimum expense involved.

Similarly, it is contemplated that the ventilation system of the instant invention be practically maintenance free while continuously maintaining the desired consistent temperature throughout the entire structure, no hot or cold spots being possible.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a perspective view of another form of ventilation system wherein the exhaust ends of the individual tubes are extended through a building wall with the flow of air therefrom being induced by a thermostat controlled variable speed fan;

FIGURE 5 is yet another form of the ventilation system of the instant invention, this form also being fan controlled;

FIGURE 6 is an enlarged cross-sectional view taken substantially on a plane passing along line 6—6 in FIGURE 5 and illustrating a typical duct cross section.

Figure 1:
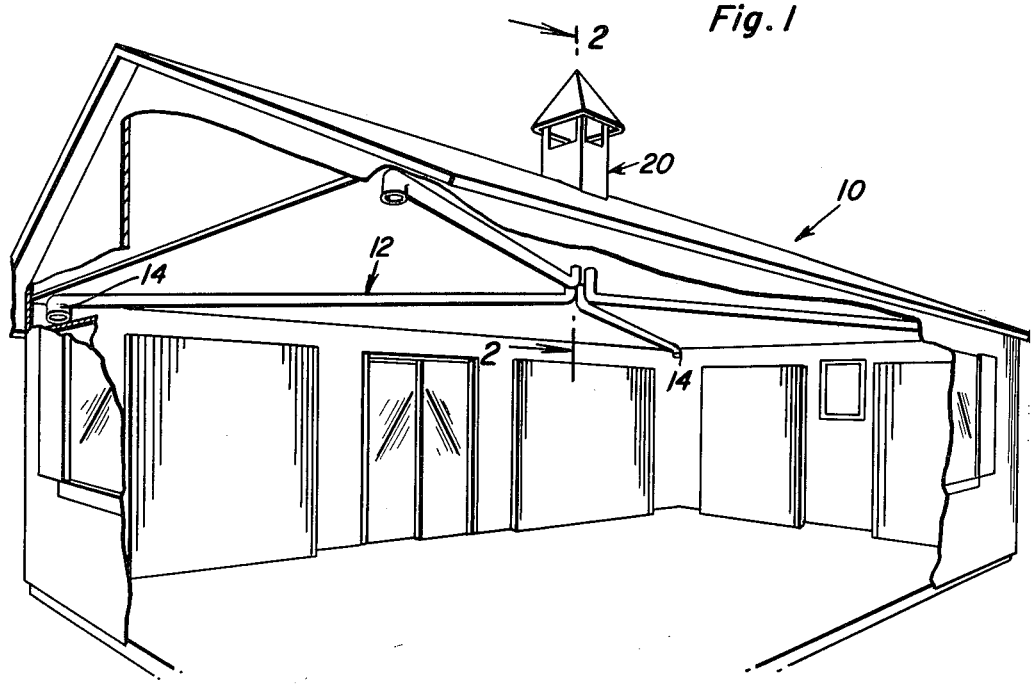
FIGURE 1 is a perspective view of a farm building with portions thereof broken away so as to illustrate one form of the ventilation system of the instant invention installed therein.

Referring now more specifically to the drawings, reference numeral 10 generally indicates a typical farm building, such as for example a poultry house or dairy barn, wherein one might desire to, for purposes of maintaining the health of the animals and increasing the production, maintain an even temperature while removing undesirable fumes, moisture and stale air. In order to accomplish this, without drafts, noise, rapid airflow, or rapid temperature changes, the instant invention contemplates the provision of a plurality of ventilation ducts 12.

Each of these ducts 12 is to have the first or intake end 14 located at or near a corner of the building 10, this intake end 14 being located at approximately the ceiling and orientated so as to open downwardly, the duct 12 being secured to the ceiling in any suitable manner such as by straps 16 or other types of hangers. The exhaust end of each duct 12 is to project through the roof of the building 10 at a central location, this exhaust end 18 opening upwardly at a point well above the roof top so as to allow for a smooth flow of air therefrom, the entire flow of air through each of the ducts 12 being in effect an exhaust flow.

Figure 2:
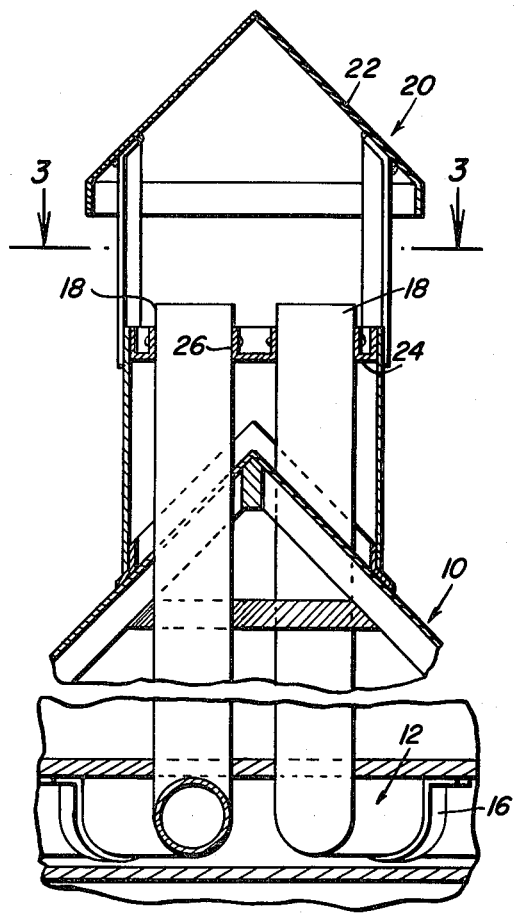
FIGURE 2 is an enlarged cross-sectional view taken substantially on a plane passing along line 2—2 in FIGURE 1 and illustrating the individual exhaust ends of each of the ventilating ducts.

As will best be appreciated from FIGURE 2, the exhaust end 18 of each of the ducts 12 is completely independent of and spaced from the duct ends 18 of the remainder of the ducts, this being deemed essential if the desired exhaust of the air is to be effectively achieved without any danger of backflow or blockage caused by air turbulence which might result from the use of a common exhaust.

As will be noted from FIGURES 1 and 2, it is contemplated that a cupola 20 be provided so as to prevent the entrance of rain into the exhaust ends 18 of the ducts 12, this cupola 20 having the roof 22 thereof spaced a sufficient distance above the upper open exhaust ends 18 so as to in no way interfere with the free flow of air therefrom, these exhaust ends 18 being maintained in position by suitable means such as the plate 24 secured within the cupola and having a plurality of duct-receiving flanged openings 26 therein.

Figure 3:
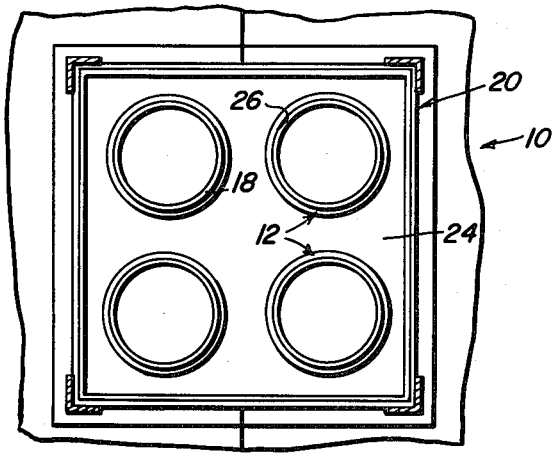
FIGURE 3 is a cross-sectional view taken substantially on a plane passing along line 3—3 in FIGURE 2.
Figure 8:
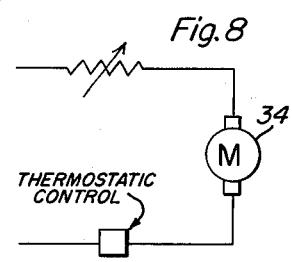
FIGURE 8 is a simplified diagram illustrating the variable speed motor and thermostatic control.

The ducts 12, either round in cross section as indicated in FIGURES 2 or 3, or rectangular as indicated in the modification of FIGURE 6, can be formed of any suitable material such as interconnected aluminum or galvanized iron sections, or extruded plastic. Regardless of the specific material used, the intake end of each duct 12 is to be directed downwardly only a slight distance below the ceiling and in the vicinity of the structure corner while the exhaust end is to be located at approximately the center of the structure 10 and is to open upwardly, extending through the roof and projecting a substantial distance thereabove so as to avoid any turbulence which might result from the flow of air around the building, the exhaust ends of the pipes being protected from rain by means of a cupola 20.

Turning now to the form of the invention illustrated in FIGURE 4, it will be noted that, similar to the system of FIGURES 1, 2 and 3, four ducts 28 are used, these ducts 28 being arranged similar to the ducts 12 with their downwardly opening intake ends 30 being located just below the ceiling at the building corners. However, rather than projecting centrally through the roof of the structure, the ducts 28, while extending inwardly toward the center of the building as was the case with the ducts 12, proceed from the center of the building to and through one of the building side walls wherein the exhaust ends 32 of the ducts 28 are maintained in position separate from and out of contact with each other by suitable means similar to the plate 24 utilized in conjunction with the ducts 12. The exhausting of the air through the ducts 28 is effected by means of a thermostat controlled variable speed exhaust fan 34 provided within a suitable protective housing 36 mounted on the structure wall, the fan 34 being orientated so as to position the suction blade thereof within approximately one inch of the exhaust ends 32 of the ducts 28, the fan 34 and exhaust ends 32 being arranged so as to provide for the drawing of an equal amount of air through each duct 28, the individual airflows through the individual ducts 28 being quickly exhausted through the housing 36 before any tendency for a back draft to occur arises. The ducts 28, as was the case with the ducts 12, can be constructed of any suitable material including both straight sections and angular sections so as to provide for the directing of each duct individually from a corner of the structure to generally the center thereof and subsequently to a side wall and then through the side wall.

FIGURE 5 illustrates a system somewhat similar to the system illustrated in FIGURE 4, however, rather than utilizing four ducts, only two ducts 38 are used. Each of the ducts 38, being located substantially at or slightly below the ceiling, extends from a first exhaust end 40 in communication with an exhaust fan 34 similar to the arrangement in FIGURE 4, centrally across the structure to the opposite wall, along the opposite wall to one end wall, along the end wall to the first side wall, and then back to exhausting communication with the fan 34 with its end 42 separate from and completely out of contact with the first end 40 of the duct 38. In other words, each of the ducts 38 extends first centrally across the room and then peripherally thereabout in opposite directions with both ends of each duct 38 being utilized as air discharge means.

In utilizing continuous ventilating ducts 38, elongated openings 44 are provided at each corner of the room, thus in effect allowing for the intake of air substantially in the same manner as in the case of the particular arrangement shown in FIGURE 4.

It will of course be recognized that, while the use of an exhaust fan 34 has only been illustrated in conjunction with the extension of the exhaust ends of the ducts through a side wall of the building, such an exhaust fan can also be utilized in conjunction with the extending of the exhaust ends of the ducts through the roof of the structure as was done with the arrangement illustrated in FIGURES 1, 2 and 3, the fan in such an instance assisting and supplementing the normal gravity exhaust flow as might be desired under certain circumstances.

Figure 7:
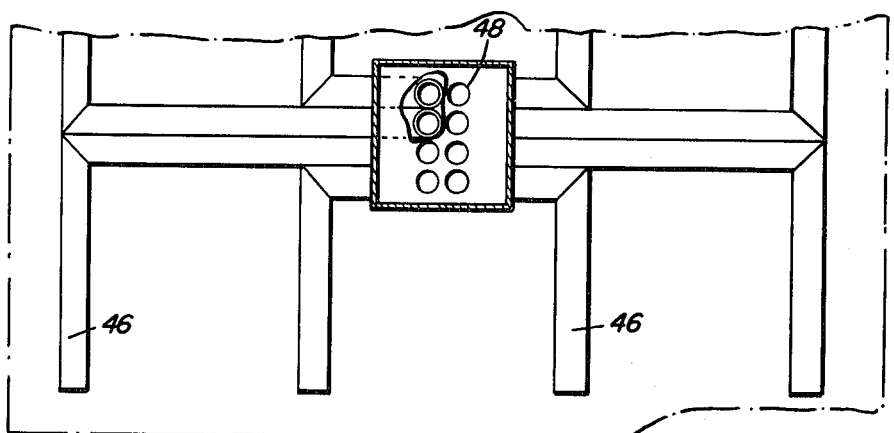
FIGURE 7 is a schematic plan view illustrating a further form of the ventilation system, this form incorporating eight independent ducts.

In the case of extremely large structures, it is contemplated that any reasonable number of ducts 46 may be utilized, eight such ducts being shown in FIGURE 7. These ducts, similar to either the ducts 12 or the ducts 28, are to be, in the same manner, individually and separately exhausted, the exhaust ends 48 of each duct paralleling the exhaust ends of the adjacent ducts but being spaced therefrom for those reasons set forth supra in regard to the exhaust ends of the ducts 12, 28 and 38. While the ducts 12 and 28 are all of equal length, each duct extending to a corner of the room, the ducts 46 will vary in length, some of these ducts extending to the corners of the room and other ones of these ducts 46 extending to intermediate parts of the room so as to insure the desired equalization of the temperature regardless of the size of the room.

From the foregoing detailed description, it is considered to be readily apparent that a novel ventilation system has been defined, this system in one form relying solely on an exhaust flow of air through a plurality of individual ventilation ducts, these ducts, normally four in number, being of equal length and extending from the outer edges of a room toward a centrally located position and from this center position to the exterior of the building, the utilization of equal length pipes being exhausted at generally the same location, resulting in the exhausting of the air from each duct at the same velocity. It will of course be appreciated that such a system controls and regulates or conditions the air at all times, the air being continually in motion with the rate of movement depending on the condition of the air itself. In addition to the strictly gravity exhaust arrangement, it has been pointed out that the present invention also contemplates the utilization of an exhaust fan positioned so as to draw equally from each of the individual ventilation ducts, these ducts having the exhaust ends thereof spaced from and independent of each other, this feature, in conjunction with the fan, or for that matter in the arrangement without the fan, being deemed of great significance as a means for preventing any undesirable down draft or backflow such as might disrupt the smooth flow of stale, moisture laden or dust laden air from the enclosed space.

The foregoing is considered as illustrative only of the principles of the invention. Further since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a ventilating system for a building having a ceiling, a plurality of generally coplanar diverging individual imperforate hollow ventilating ducts, each duct being positioned adjacent the building ceiling and having a first open intake end thereof opening downwardly adjacent a peripheral portion of the building and a second open exhaust end thereof projecting through a portion of the building and communicating with the exterior thereof, the first ends of the ducts being peripherally spaced about the interior of the building, the second ends of the ducts being adjacent but out of communication with each other and extending parallel to each other to the exterior of the building, said ducts, from the first ends thereof, extending individually radially inwardly toward approximately the center of the building and from the center of the building generally parallel to and through an exterior wall, and a thermostat controlled variable speed exhaust fan mounted on the exterior wall with the fan blade positioned just outward of the exhaust ends of the ducts and orientated so as to draw air equally through each of the ducts.

2. In a ventilating system for a building having a ceiling, a plurality of generally coplanar diverging individual imperforate hollow ventilating ducts, each duct being positioned adjacent the building ceiling and having a first open intake end thereof opening downwardly adjacent a peripheral portion of the building and a second open exhaust end thereof projecting through a portion of the building and communicating with the exterior thereof, the first ends of the ducts being peripherally spaced about the interior of the building, the second ends of the ducts being adjacent but out of communication with each other and extending parallel to each other to the exterior of the building, said ducts, from the first ends thereof, extending individually toward each other, and a thermostat controlled variable speed exhaust fan mounted on the exterior wall with the fan blade positioned just outward of the exhaust ends of the ducts and orientated so as to draw air equally through each of the ducts.

References Cited by the Examiner

UNITED STATES PATENTS

| | | | |
|---|---|---|---|
| 672,488 | 4/01 | Miller | 98—33 |
| 862,981 | 8/07 | Lorimer | 98—42 |
| 901,075 | 10/08 | Darroch | 98—35 |
| 1,263,833 | 4/18 | Akerlund | 98—35 |
| 1,566,368 | 12/25 | Brandl | 98—35 |
| 2,038,578 | 4/36 | Lamb | 98—33 |
| 2,184,484 | 12/39 | Bojner | 98—33 |
| 2,801,581 | 8/57 | Sprinchorn | 98—33 |

ROBERT A. O'LEARY, *Primary Examiner.*

MEYER PERLIN, *Examiner.*